(12) United States Patent
Chen

(10) Patent No.: US 10,978,974 B2
(45) Date of Patent: Apr. 13, 2021

(54) MOTOR STARTING DEVICE AND METHOD

(71) Applicant: ANPEC ELECTRONICS CORPORATION, Hsinchu (TW)

(72) Inventor: Kun-Min Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/687,913

(22) Filed: Nov. 19, 2019

(65) Prior Publication Data
US 2021/0050806 A1 Feb. 18, 2021

(30) Foreign Application Priority Data

Aug. 13, 2019 (TW) .................. 108128810

(51) Int. Cl.
H02P 6/182 (2016.01)
H02P 6/22 (2006.01)
(52) U.S. Cl.
CPC ............... *H02P 6/182* (2013.01); *H02P 6/22* (2013.01)
(58) Field of Classification Search
CPC .................................. H02P 6/182; H02P 6/22

USPC ..... 318/400.35, 400.34, 400.32, 400.01, 700
See application file for complete search history.

(56) References Cited

U.S. PATENT DOCUMENTS 8,933,657 B2 * 1/2015 Wang ................. H02P 6/20
318/400.06

* cited by examiner

*Primary Examiner* — David Luo
(74) *Attorney, Agent, or Firm* — Li & Cai Intellectual Property (USA) Office

(57) ABSTRACT

A motor starting device includes a starting unit, a driving unit, a floating point selecting unit, a back electromotive force (BEMF) detecting unit and a control unit. In a starting mode, the starting unit generates an initial starting signal having a plurality of phases according to a commutation sequence, the driving unit drives the motor with a first phase in the initial starting signal, the floating point selecting unit selects a floating phase of the motor that is not turned on according to the driving condition of the driving unit, the BEMF detecting unit detects whether the BEMF of the floating phase has a first voltage level or a second voltage level to generate a detection result, and the control unit outputs a phase changing signal to the driving unit according to the detection result.

16 Claims, 13 Drawing Sheets

MOTOR STARTING DEVICE AND METHOD

CROSS-REFERENCE TO RELATED PATENT APPLICATION

This application claims the benefit of priority to Taiwan Patent Application No. 108128810, filed on Aug. 13, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor starting device and method, and more particularly to a motor starting device and method for a sensorless three-phase motor.

BACKGROUND OF THE DISCLOSURE

Direct current (DC) brushless motors are common motors having advantages of high efficiency, lightness, thinness, shortness, and smallness, thus the DC brushless motors are widely used in various fields. In existing electronic products (e.g., personal computers, notebook computers, communication devices and household appliances), DC brushless motors are used. For example, fan motors for various electronic products and spindle motors for computer storage devices utilize DC brushless motors. In general, when driving a DC brushless motor, a position of a rotor of the motor must be detected to properly drive commutation switches for performing a commutation procedure.

An existing brushless DC motor system typically includes a three-phase brushless DC motor, a Hall sensor, and a driver. However, since the Hall sensor is easily affected by the external environment, the sensing accuracy may be lowered, and may even result in malfunctioning in some environments (e.g., an environment with an excessive temperature). On the other hand, the brushless DC motor system further includes the Hall sensor, and a volume of the system and manufacturing costs are therefore increased. Therefore, a sensorless driving method without using a sensor has been further provided.

In an existing sensorless driving method, after the motor is driven in an open circuit configuration, an excitation phase is set to drive the rotor of the motor to a certain position, and a commutation time and the corresponding shortening speed is then set, thereby speeding up the commutation of the motor until a rotation speed of the motor reaches a certain set speed, then enters a closed loop mode for driving.

However, in the above method, starting the motor by the open circuit configuration requires setting some inertia parameters of the motor, resulting in complicated settings, and requires multiple pins to control the above parameters or requires memory to be burned in, thereby increasing motor design costs and mass production costs. Moreover, when the motor ages, the driving method using the open circuit configuration is likely to cause a risk of being out of step in the driving process.

Therefore, there is an urgent need for a motor starting device and method that do not require adjustment of inertia parameters, while saving motor design time and decreasing mass production costs.

SUMMARY OF THE DISCLOSURE

In response to the above-referenced technical inadequacies, the present disclosure provides a motor starting device and method for a sensorless three-phase motor.

In one aspect, the present disclosure provides a motor starting device including a starting unit, a driving unit, a floating point selecting unit, a back electromotive force (BEMF) detecting unit and a control unit. The starting unit is configured to switch between a starting mode and an operating mode. In the starting mode, the starting unit generates an initial starting signal having a plurality of phases according to a commutation sequence, and the commutation sequence is set according to a predetermined rotation direction of the motor. The driving unit is coupled to the starting unit and the motor and configured to drive the motor with a first phase of the initial starting signal. The floating point selecting unit is coupled to the driving unit and the motor, and is configured to select a floating phase of the motor that is not turned on according to a driving condition of the driving unit. The back electromotive force (BEMF) detecting unit is coupled to the floating point selecting unit and configured to detect whether a back electromotive force (BEMF) of the floating phase has a first voltage level or a second voltage level to generate a detection result. The control unit is coupled to the BEMF detecting unit and the driving unit and configured to control, according to the commutation sequence, the BEMF detecting unit to detect whether the BEMF of the floating phase has the first voltage level or the second voltage level, and output a phase changing signal to the driving unit according to the detection result. After the motor is driven by the first phase of the initial starting signal, the BEMF detecting unit is configured to detect whether a voltage of the BEMF of the floating phase has a second voltage level, and if so, the BEMF detecting unit generates a detection result, and the control unit is configured to output the commutation signal to the driving unit. The driving unit is configured to, in response to receiving the commutation signal, drive the motor with a second phase after the first phase according to the commutation sequence. The control unit controls the BEMF detecting unit to detect whether the voltage of the BEMF of the floating phase has the first voltage level, and if the voltage of the BEMF of the floating phase has the first voltage level, the BEMF detecting unit generates the detection result, and the control unit is configured to output the commutation signal to the driving unit according to the detection result. The control unit is configured to determine whether the detection result is generated within a predetermined time, if the detection result is not generated within the predetermined time, the control unit generates a forced commutation signal to control the driving unit to drive the motor with a phase next to a current phase of the used initial starting signal according to the commutation sequence.

In some embodiments, the control unit is configured to calculate a number of the detection results, and determine whether the number of the detection results exceeds a predetermined number, and if the number of the detection results exceeds the predetermined number, the control unit is configured to control the starting unit to enter the operating mode to generate an operating signal, and the driving unit drives the motor according to the operating signal.

In some embodiments, the BEMF detecting unit includes a hysteresis comparator configured to detect whether the BEMF of the floating phase is larger than a positive value of a hysteresis voltage or smaller than a negative value of the hysteresis voltage. The hysteresis comparator generates a high voltage level or a low voltage level as the detection result.

In some embodiments, the control unit is configured to set the hysteresis comparator to the first voltage level according to the commutation sequence of the plurality of phases to determine whether the BEMF of the floating phase is smaller than the negative value of the hysteresis voltage, or the control unit is configured to set the hysteresis comparator to the second voltage level to determine whether the BEMF of the floating phase is larger than the positive value of the hysteresis voltage.

In some embodiments, when the hysteresis comparator is set to the first voltage level to determine whether the BEMF of the floating phase is smaller than the negative value of the hysteresis voltage, if the BEMF of the floating phase is determined to be smaller than the negative value of the hysteresis voltage, the hysteresis comparator generates the low voltage level as the detection result.

In some embodiments, when the hysteresis comparator is set to the second voltage level to determine whether the BEMF of the floating phase is larger than the positive value of the hysteresis voltage, if the BEMF of the floating phase is determined to be larger than the positive value of the hysteresis voltage, the hysteresis comparator generates the high voltage level as the detection result.

In some embodiments, the control unit is further configured to, after the commutation signal or the forced commutation signal is generated, control the BEMF detecting unit to detect the BEMF of the floating phase after a masking duration.

In some embodiments, after the driving unit receives the commutation signal or the forced commutation signal, the driving unit converts the phase next to the current phase of the initial switching signal used to drive the motor to a soft switching signal to drive the motor.

In one aspect, the present disclosure provides a motor starting method for starting a motor. The motor starting method includes the following steps: configuring a starting unit to enter a starting mode to generate an initial starting signal having a plurality of phases according to a commutation sequence, and the commutation sequence is set according to a predetermined rotation direction of the motor; configuring a driving unit to drive the motor with a first phase of the initial starting signal; configuring a floating point selecting unit to select a floating phase of the motor that is not turned on according to a driving condition of the driving unit; configuring a back electromotive force (BEMF) detecting unit to detect whether a back electromotive force (BEMF) of the floating phase has a first voltage level or a second voltage level to generate a detection result; configuring a control unit to control, according to the commutation sequence, the BEMF detecting unit to detect whether the BEMF of the floating phase has the first voltage level or the second voltage level, and output a phase changing signal to the driving unit according to the detection result; configuring the control unit to determine whether the detection result is generated within a predetermined time, and if the detection result is not generated within the predetermined time, configuring the control unit to generate a forced commutation signal to control the driving unit to drive the motor with a phase next to a current phase of the used initial starting signal according to the commutation sequence; configuring the BEMF detecting unit to, after the motor is driven by the first phase of the initial starting signal, detect whether a voltage of the BEMF of the floating phase has the second voltage level, and if the voltage of the BEMF of the floating phase has the second voltage level, configuring the BEMF detecting unit to generate the detection result, and configuring the control unit to output the commutation signal to the driving unit; and configuring the driving unit to, in response to receiving the commutation signal, drive the motor with a second phase after the first phase according to the commutation sequence, and configuring the control unit to control the BEMF detecting unit to detect whether the voltage of the BEMF of the floating phase has the first voltage level, and if the voltage of the BEMF of the floating phase has the first voltage level, configuring the BEMF detecting unit to generate the detection result, and configuring the control unit to output the commutation signal to the driving unit according to the detection result.

In some embodiments, the motor starting method further includes configuring the control unit to calculate a number of the detection results, and determine whether the number of the detection results exceeds a predetermined number, and if the number of the detection results exceeds a predetermined number, configuring the control unit to control the starting unit to enter an operating mode to generate an operating signal, and the driving unit to drive the motor according to the operating signal.

In some embodiments, the BEMF detecting unit includes a hysteresis comparator, and the motor starting method further includes: configuring the hysteresis comparator to detect whether the BEMF of the floating phase is larger than a positive value of a hysteresis voltage or smaller than a negative value of the hysteresis voltage, and generate a high voltage level or a low voltage level as the detection result.

In some embodiments, the motor starting method further includes: configuring the control unit to set the hysteresis comparator to the first voltage level according to the commutation sequence of the plurality of phases to determine whether the BEMF of the floating phase is smaller than the negative value of the hysteresis voltage, or configuring the control unit to set the hysteresis comparator to the second voltage level to determine whether the BEMF of the floating phase is larger than the positive value of the hysteresis voltage.

In some embodiments, when the hysteresis comparator is set to the first voltage level to determine whether the BEMF of the floating phase is smaller than the negative value of the hysteresis voltage, and if the BEMF of the floating phase is determined to be smaller than the negative value of the hysteresis voltage, the hysteresis comparator generates the low voltage level as the detection result.

In some embodiments, when the hysteresis comparator is set to the second voltage level to determine whether the BEMF of the floating phase is larger than the positive value of the hysteresis voltage, and if the BEMF of the floating phase is determined to be larger than the positive value of the hysteresis voltage, the hysteresis comparator generates the high voltage level as the detection result.

In some embodiments, the motor starting method further includes: configuring the control unit to, after the commutation signal or the forced commutation signal is generated, control the BEMF detecting unit to detect the BEMF of the floating phase after a masking duration.

In some embodiments, the motor starting method further includes configuring the driving unit to, after the driving unit receives the commutation signal or the forced commutation signal, convert the phase next to the current phase of the initial switching signal used to drive the motor to a soft switching signal to drive the motor.

Therefore, the motor starting device and method provided by the present disclosure do not need to adjust inertia parameters, and dead points of zero torque can be avoided by adding forced commutation parameters, thereby saving motor design time and other programming costs while providing high applicability and advantages for fan products that are diverse and produced in small quantities.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
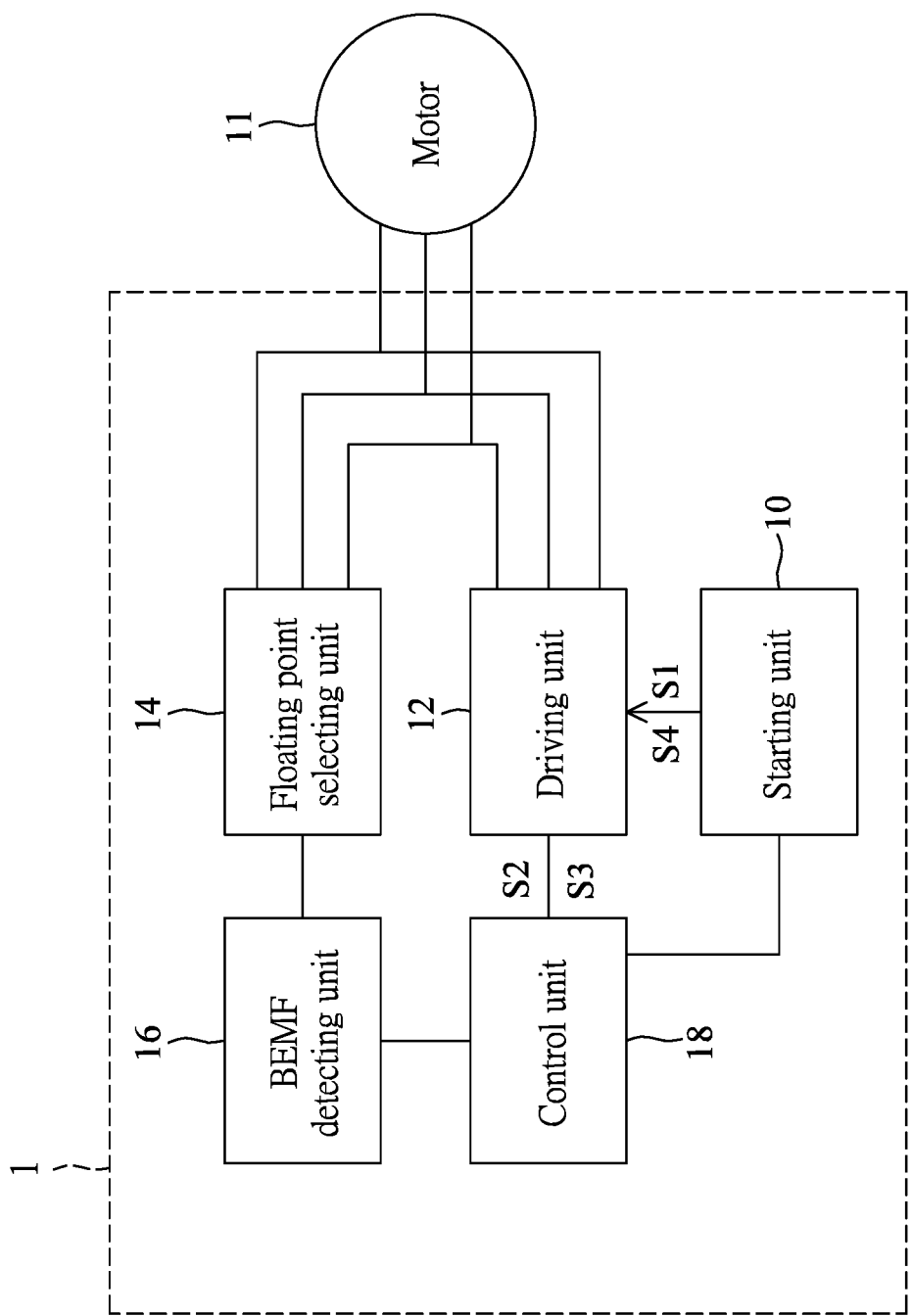
FIG. 1 is a circuit schematic diagram of a motor starting device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
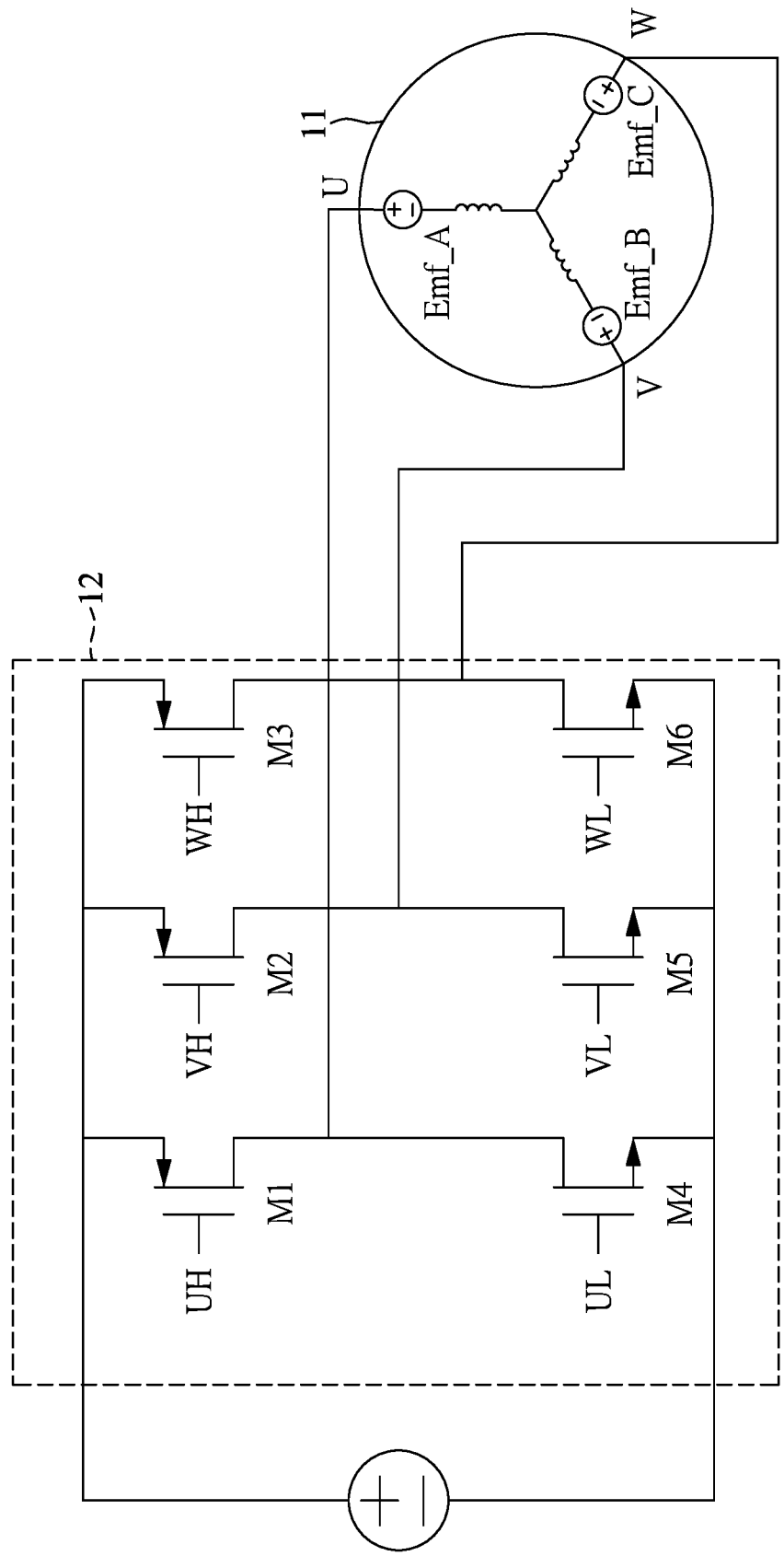
FIG. 2 is a circuit schematic diagram of a motor and a driving unit according to an embodiment of the present disclosure.
Figure 3:
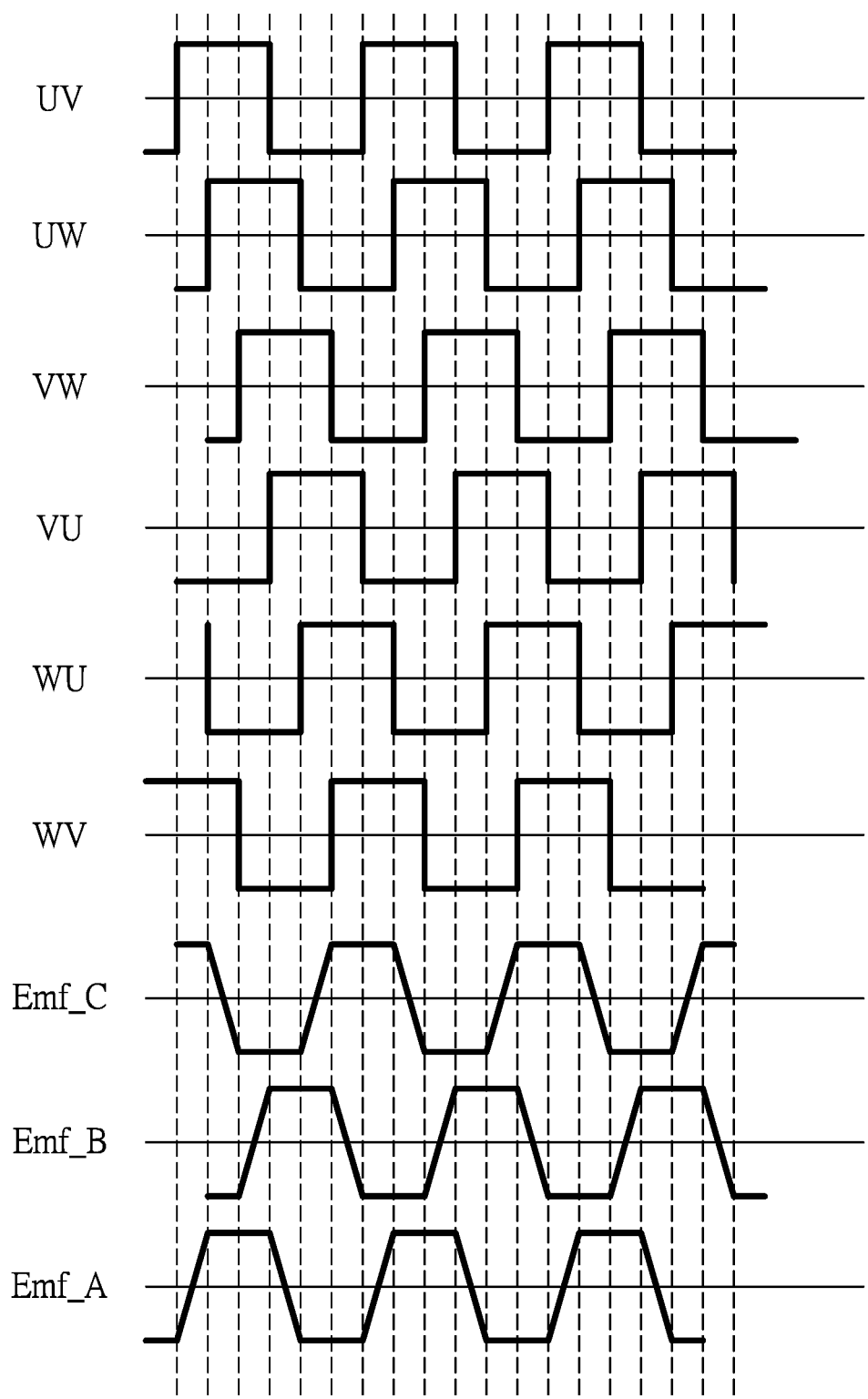
FIG. 3 is a schematic diagram showing a back electromotive force (BEMF) voltage of a floating phase corresponding to a torque generated by a motor in a forward rotation direction according to an embodiment of the present disclosure.

Reference is made to FIGS. 1 to 3, FIG. 1 is a circuit schematic diagram of a motor starting device according to an embodiment of the present disclosure, FIG. 2 is a circuit schematic diagram of a motor and a driving unit according to an embodiment of the present disclosure, and FIG. 3 is a schematic diagram showing a back electromotive force (BEMF) voltage of a floating phase corresponding to a torque generated by a motor in a forward rotation direction according to an embodiment of the present disclosure.

Reference is made to FIG. 1, a first embodiment of the present disclosure provides a motor starting device 1 for starting a motor 11, and the motor starting device 1 includes a starting unit 10, a driving unit 12, a floating point selecting unit 14, a back electromotive force (BEMF) detecting unit 16, and a control unit 18. The motor 11 can be a three-phase brushless DC motor.

The starting unit 10 is switchable between a starting mode and an operating mode. In the starting mode, the starting unit 10 generates an initial starting signal S1 having a plurality of phases according to a commutation sequence, and the commutation sequence is set according to a predetermined rotation direction of the motor 11.

As shown in FIG. 2, the driving unit 12 is coupled to the starting unit 10 and the motor 11, and is configured to drive the motor 11 with a first phase of the initial starting signal S1. The driving unit 12 can receive the initial startup signal S1 to output the switching signals UH, UL, VH, VL, WH, and WL respectively to control on or off states of respective switching elements in the driving unit 12.

In general, the motor 11 has three windings, which are a U coil winding U, a V coil winding V, and a W coil winding W. As can be seen from a circuit architecture of FIG. 2, the driving unit 12 includes transistors M1, M2, M3, M4, M5, and M6. When the transistor M1 and the transistor M5 are turned on, a current of the motor 11 is operated by a power source through the transistor M1. The current for driving the motor 11 flows from the power supply terminal, through the transistor M1, the U coil winding U, and the V coil winding V of the motor 11, and then flows to the ground terminal through the transistor M5.

Generally, the currents for controlling a normal motor flows from the U coil winding U to the V coil winding V, the U coil winding U to the W coil winding W, and then changes a direction of the currents to flowing from the U coil winding U to the W coil winding W, from the V coil winding V to the W coil winding W, from the V coil winding V to the U coil winding U, and then V coil winding V to the W coil winding W. Next, other phase changes continuously control the flow direction of the current of the U coil winding U, the V coil winding V, the W coil winding W, thereby controlling the rotation direction of the motor. A phase change of the motor is described in the above embodiment, however, this is only one kind of motor phase changing control, other phase changing methods of the motor will not be described herein.

Furthermore, the commutation sequence can be, for example, as shown in FIG. 3, which are sequentially arranged UV, UW, VW, VU, WU, and WV. According to this commutation sequence, the starting unit 10 can generate the initial starting signal S1 having multiple phases, and the commutation sequence UV, UW, VW, VU, WU, and WV are set according to a predetermined rotation direction of the motor, such as the forward rotation direction. FIG. 3 also shows the generated torque and the corresponding BEMF in the commutation sequence UV, UW, VW, VU, WU and WV. When the U coil winding serves as the floating phase, a BEMF generated thereby is Emf_A, when the V coil winding V serves as the floating phase, a BEMF generated thereby is Emf_B, and when the W coil winding W serves as the floating phase, a BEMF generated thereby is Emf_C.

Further, the floating point selecting unit 14 is coupled to the driving unit 12 and the motor 11 for selecting a floating phase that is not turned on in the motor 11 according to a driving condition of the driving unit 12. For example, in a case of UV in the commutation sequence, that is, the U coil winding U and the V coil winding V are turned on, and at this time, the floating phase that is not turned on in the motor 11 is the W coil winding W. In a case of UW in the commutation sequence, that is, the U coil winding U and the W coil winding W are turned on, and at this time, the floating phase that is not turned on in the motor 11 is the V coil winding V.

Further, the BEMF detecting unit 16 is coupled to the floating point selecting unit 14 and configured to detect whether the BEMF of the floating phase has a first voltage level or a second voltage level to generate a detection result. For example, in a case of UV in the commutation sequence, that is, the U coil winding U and the V coil winding V are turned on, and at this time, the BEMF detecting unit 16 detects whether the floating phase of the motor 11 being turned off (i.e., the coil winding W) has a first voltage level or a second voltage level. The first voltage level may be a high potential larger than 0, and the second voltage level may be a low potential smaller than 0, thereby generating the detection result.

Furthermore, the control unit 18 is coupled to the BEMF detecting unit 16 and the driving unit 14 and configured to control, according to the commutation sequence such as the commutation sequence UV, UW, VW, VU, WU, and WV, the BEMF detecting unit 16 to detect the BEMF of the floating phase to determine whether the BEMF has the first voltage level or the second voltage level, and output a phase changing signal S2 to the driving unit 12 according to the detection result.

After the motor 11 is driven by the first phase of the initial starting signal S1, for example, the first phase may be a switching signal for controlling the U coil winding U and the V coil winding V to be turned on, and the BEMF detecting unit 16 detects whether the BEMF of the floating phase (in this case, a BEMF Emf_C) has a second voltage level, and if so, a detection result is generated, and the control unit 18 is configured to output the commutation signal S2 to the driving unit 12.

When the driving unit 12 receives the commutation signal S2, the motor 11 can be driven by a second phase after the first phase according to the commutation sequence. For example, when the first phase is the switching signal that controls the U coil winding U and the V coil winding V to be turned on, the second phase is a switching signal that controls U coil winding U and the W coil winding W to be turned on according to the commutation sequence UV, UW, VW, VU, WU, and WV. Next, the control unit 18 controls the BEMF detecting unit 16 to detect whether a voltage of the BEMF (in this case, a BEMF Emf_B) of the floating phase (in this case, V) has the first voltage level, and if so, the detection result is generated. The control unit 18 is configured to output the commutation signal S2 to the driving unit 14 according to the detection result. More specifically, the control unit 18 determines, according to the commutation sequence, that the first voltage level or the second voltage level (e.g., a high voltage level larger than 0 or a low voltage level smaller than 0) should be detected by the BEMF detecting unit 16. For example, depending on the commutation sequence UV and UW, and a tendency of the BEMFs expected to be generated on the U coil winding U, the V coil winding V, and the W coil winding W, the BEMF detecting unit 16 is controlled to detect the second voltage level (a low voltage level smaller than 0) during the commutation sequence UV, and detects the first voltage level (a high voltage level larger than 0) during the commutation sequence UW.

Furthermore, the control unit 18 may include a counter for determining whether the detection result is generated within a predetermined time. If not, the control unit 18 generates a forced commutation signal S3 to control the driving unit 12 to use a phase next to a current phase of the used initial starting signal S1 to drive the motor 11 according to the commutation sequence. For example, when the current phase is a switching signal that controls the U coil winding U and the V coil winding V to be turned on, the next phase is a switching signal that controls the U coil winding U and the W coil winding W to be turned on according to the commutation sequence UV, UW, VW, VU, WU, and WV. In other words, when the BEMF detecting unit 16 does not detect the corresponding BEMF signal within the predetermined time, it is forcibly switched from UV to UW. In detail, the forced commutation time is provided to prevent a rotor from stopping at a point where a combined total torque is close to 0 during an excitation, and a duration set for forced starting cannot be smaller than a duration of an inertia commutation when the rotor is starting.

Thereafter, taking a three-phase sensorless motor as an example, the high and low levels of the BEMF voltage of the floating phase are detected by using three phases of six steps as a cycle, the purpose of which is to make the commutation point to be closer to a zero point of the BEMF by detecting the voltage level of the BEMF of the floating phase so as to properly start the motor 11, and the motor 11 can then enter the operation mode after the motor 11 is stabilized. Furthermore, there is no need to detect the BEMF zero point, and the necessity of setting inertia parameters for the motor can be omitted.

In some embodiments, the control unit 18 can further calculate a number of the detection results, and the control unit 18 is configured to determine whether the number of the detection results exceeds a predetermined number, and if so, the control unit 18 is configured to control the starting unit 10 to enter the operating mode to generate an operating signal S4, and the driving unit 12 drives the motor 11 according to the operating signal S4.

In some embodiments, the back electromotive force detecting unit 16 can be a hysteresis comparator configured to detect whether the BEMF of the floating phase is larger than a positive value of a hysteresis voltage or smaller than a negative value of the hysteresis voltage so as to generate a high voltage level H or a low voltage level L as the detection result.

For example, the control unit 18 can set the hysteresis comparator to the first voltage level according to the commutation order UV, UW, VW, VU, WU, and WV, thereby determining whether the BEMF of the floating phase is smaller than the negative value of the hysteresis voltage, or the control unit 18 can set the hysteresis comparator to the second voltage level to determine whether the back electromotive force of the floating phase is larger than the positive value of the hysteresis voltage.

In detail, when the commutation sequence is UV, the control unit 18 can set the hysteresis comparator to the high voltage level. At this time, the hysteresis comparator detects whether the BEMF of the floating phase (at this time, the BEMF is the BEMF Emf_C of the W coil winding W) is smaller than the negative value of the hysteresis voltage. When the commutation sequence is UW, the control unit 18 can set the hysteresis comparator to the low voltage level. At this time, the hysteresis comparator detects whether the BEMF of the floating phase (at this time, the BEMF is the BEMF Emf_B of the V coil winding V) is larger than the positive value of the hysteresis voltage. In this way, it is possible to avoid a situation in which the comparator misjudges the voltage level of the BEMF interfered by a small disturbance of the voltage, thereby improving the accuracy of the detection.

In some embodiments, when the hysteresis comparator is set to the first voltage level to determine whether the BEMF of the floating phase is smaller than the negative value of the hysteresis voltage, and if the BEMF of the floating phase is determined to be smaller than the negative value of the hysteresis voltage, the hysteresis comparator generates the low voltage level as the detection result. On the other hand, when the hysteresis comparator is set to the second voltage level to determine whether the BEMF of the floating phase is larger than the positive value of the hysteresis voltage, and if the BEMF of the floating phase is determined to be larger than the positive value of the hysteresis voltage, the hysteresis comparator generates the high voltage level as the detection result.

In some embodiments, the control unit 18 can also be configured to, after the commutation signal S2 or the forced commutation signal S3 is generated, control the BEMF detecting unit 16 to detect the BEMF of the floating phase after a masking duration, and the purpose of which is to avoid misjudgment of the BEMF voltage level when the floating phase is switched and a stable voltage is not reached.

In some embodiments, after the driving unit 12 receives the commutation signal S2 or the forced commutation signal S4, the driving unit 12 converts the phase next to the current phase of the initial switching signal S1 used to drive the motor 11 to a soft switching signal to drive the motor. For example, for a motor coil and the rotor, when approaching a timing of the commutation, since a relative distance between the motor coil and the rotor gradually decreases, an induced electromotive force changes to increase the current of the coil; however, switching elements are switched at the timing the commutation, causing the current of the coil to drop rapidly. This sharp change in current not only causes noise, but since a magnetic field generated by the motor coil is not greatly helpful to a rotation of the motor when magnetic poles of the rotor is close to the motor coil, therefore, when the rotor pole approaches the motor coil, increasing of the current of the coil does not significantly contribute to the drive motor. The current can be understood as an ineffective current when driving the motor, and power consumptions and the magnetic field generated thereby are regarded as being wasteful. Therefore, the soft switching signal can define a fixed early switching interval to adjust a timing of the original initial switching signal S1 to generate a new control signal to discharge the current of the coil to zero earlier, thereby avoiding generation of invalid current.

Figure 4:
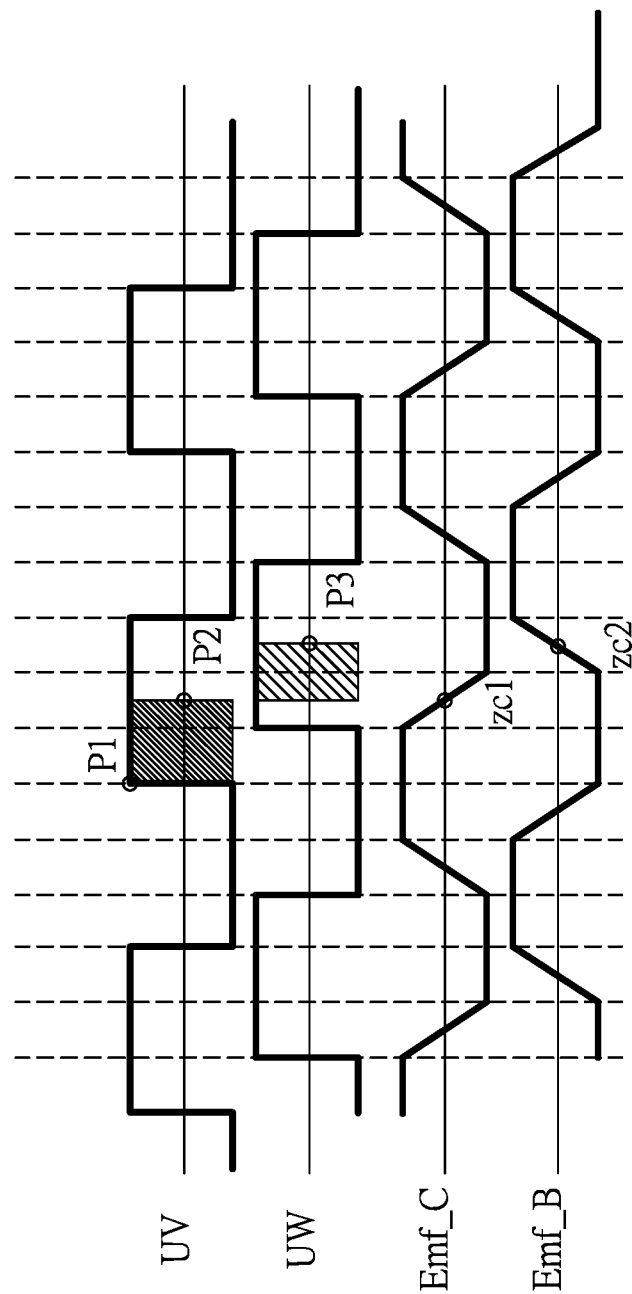
FIG. 4 is a schematic diagram showing a back electromotive force (BEMF) voltage of a floating phase corresponding to a torque generated by a motor in a forward rotation direction according to a first example of motor starting of an embodiment of the present disclosure.
Figure 5:
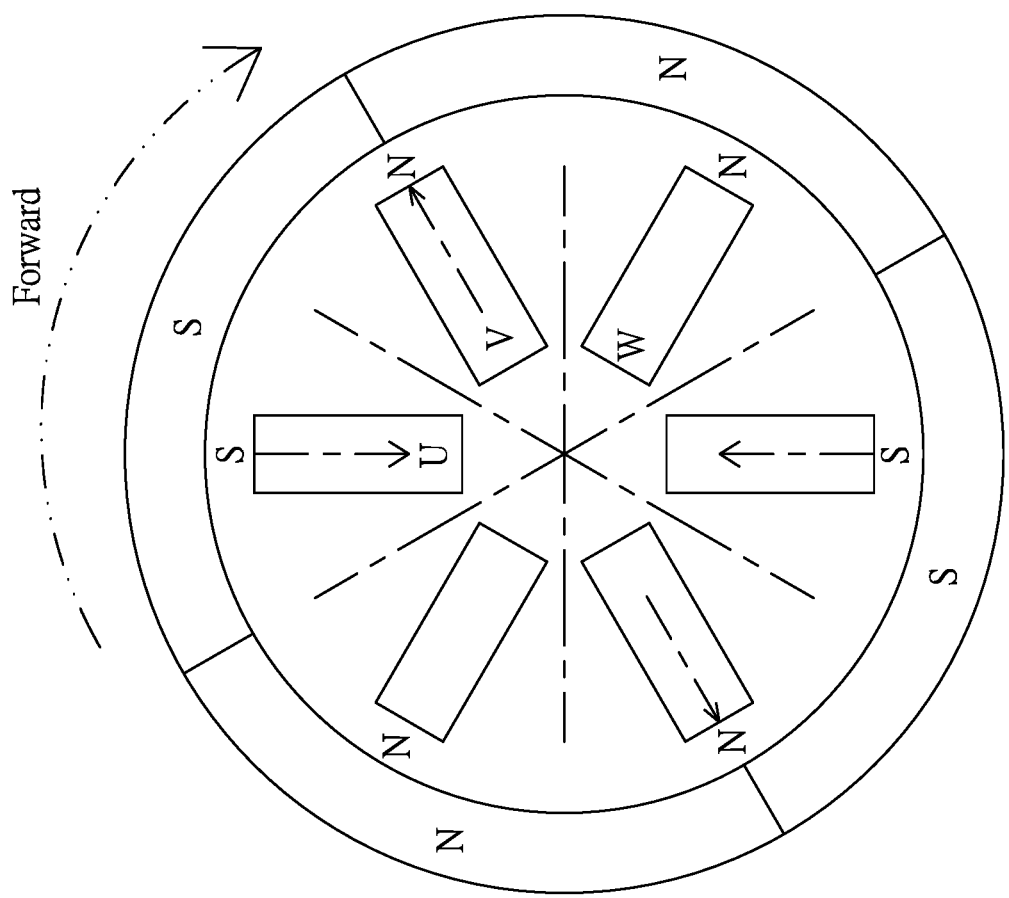
FIG. 5 is a schematic view showing relative positions of a rotor and a stator of the motor according to the first example of motor starting of an embodiment of the present disclosure.

Further, reference is made to FIGS. 4 and 5, FIG. 4 is a schematic diagram showing a BEMF voltage of a floating phase corresponding to a torque generated by a motor in a forward rotation direction according to a first example of the motor starting of an embodiment of the present disclosure, and FIG. 5 is a schematic view showing relative positions of a rotor and a stator of the motor according to the first example of the motor starting of an embodiment of the present disclosure.

As shown in FIGS. 4 and 5, it is assumed that an initial position of the motor 11 is a position P1, the rotor and the stator of the motor 11 are schematically shown in FIG. 5, the motor 11 is a four-pole, six-slot motor, magnetic poles N and S of the rotor and magnetic poles N and S generated by induction are as shown. The control unit 18 can set the hysteresis comparator to the first voltage level according to the commutation sequence UV, and further determine whether the BEMF of the floating phase (in this case, the BEMF Emf_C) is smaller than the negative value of the hysteresis voltage. At this time, since the U phase generates the S pole, the V phase generates the N pole, the rotor rotates forward, the N pole of the rotor approaches the floating phase, and the BEMF of the N pole is generated, thereby making the BEMF Emf_C to be generated with a positive value. When the N pole of the rotor is far from the floating phase, the BEMF of the S pole is generated, the BEMF Emf_C is turned into a negative value, and the hysteresis comparator detects a zero-crossing point zc1 to generate the detection result. The control unit 18 further generates the commutation signal S2 at a position P2, the commutation sequence is thereby entered UW from UV.

After the commutation sequence enters UW, the control unit 18 can set the hysteresis comparator to the second voltage level according to the commutation sequence UW, thereby determining whether the BEMF of the floating phase (in this case, the BEMF Emf_B) is larger than the positive value of the hysteresis voltage. At this time, since the S pole of the rotor approaches the floating phase, the BEMF of the S pole is generated, thereby generating the BEMF Emf_B with a negative value. When the S pole of the rotor is far from the floating phase, the BEMF of the N pole is generated, the BEMF Emf_B is turned into a positive value, and the hysteresis comparator detects a zero-crossing point zc2 to generate the detection result. The control unit 18 further generates the commutation signal S2 at a position P3, thereby making the commutation sequence to enter VW from UW. In the present example, since the hysteresis comparator can completely detect a complete trend of the BEMF from positive to negative or negative to positive, a timing at which the commutation signal S2 is generated is a correct commutation timing, and the detection result corresponds to an ideal commutation point. After the motor 11 is stably started, the motor 11 can enter the operating mode.

Figure 6:
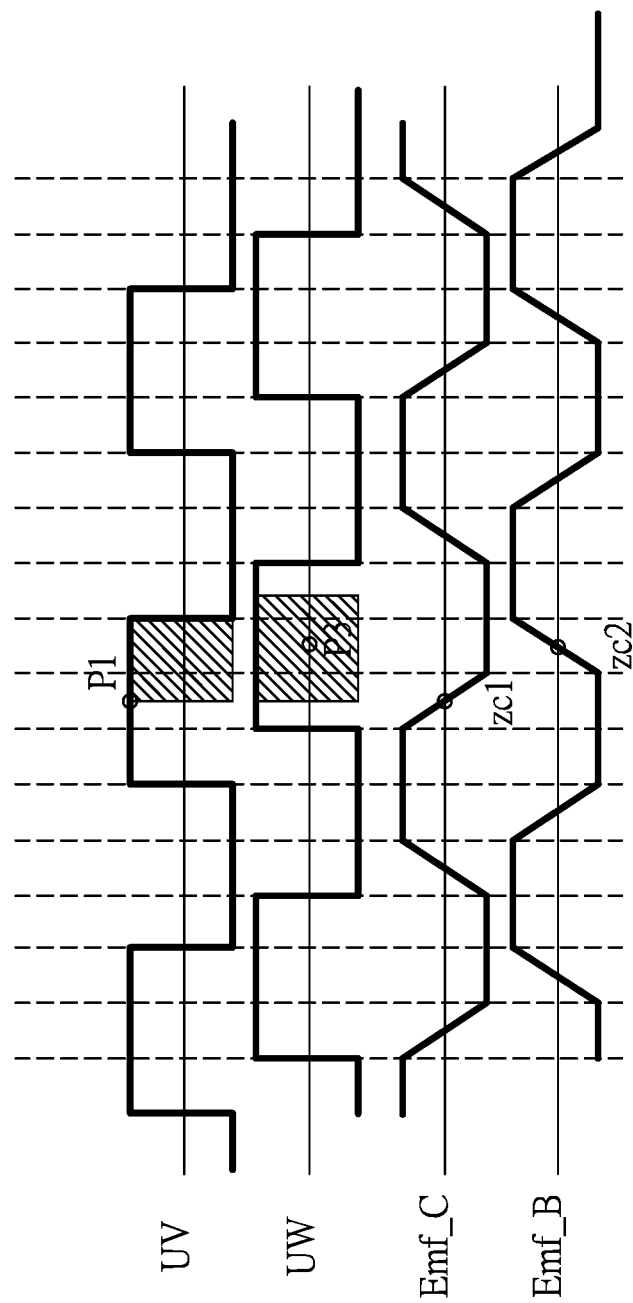
FIG. 6 is a schematic diagram showing a back electromotive force (BEMF) voltage of a floating phase corresponding to a torque generated by a motor in a forward rotation direction according to a second example of motor starting of an embodiment of the present disclosure.
Figure 7:
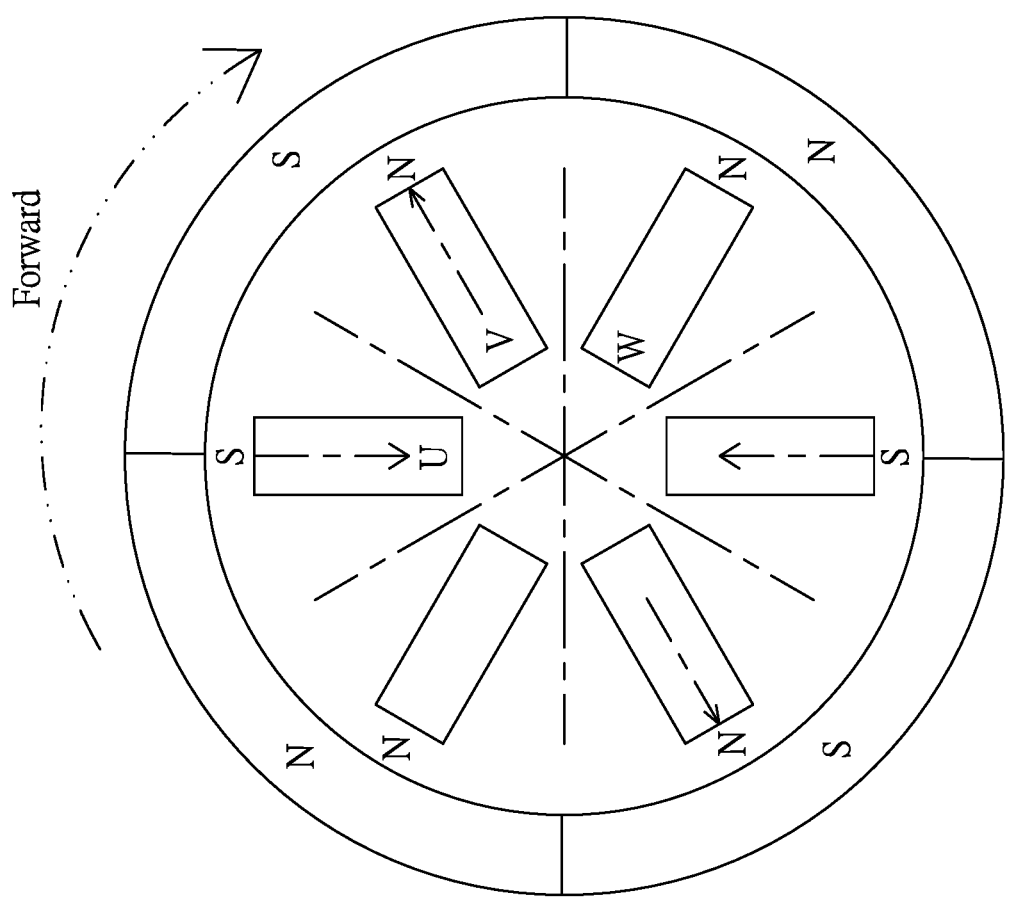
FIG. 7 is a schematic view showing relative positions of a rotor and a stator of the motor according to the second example of motor starting of an embodiment of the present disclosure.

Further, reference is made to FIGS. 6 and 7, FIG. 6 is a schematic diagram showing a BEMF voltage of a floating phase corresponding to a torque generated by a motor in a forward rotation direction according to a second example of motor starting of an embodiment of the present disclosure, and FIG. 7 is a schematic view showing relative positions of a rotor and a stator of the motor according to the second example of motor starting of an embodiment of the present disclosure.

As shown in FIGS. 6 and 7, it is assumed that an initial position of the motor 11 is a position P1, and a rotor and a stator of the motor 11 are schematically shown in FIG. 7. The control unit 18 can set the hysteresis comparator to the first voltage level according to the commutation sequence UV, and further determine whether the BEMF of the floating phase (in this case, the BEMF Emf_C) is smaller than the negative value of the hysteresis voltage. At this time, since the U phase generates the S pole and the V phase generates the N pole, causing the rotor to rotate forward, and the N pole of the rotor is rotated from near the floating phase to move away from the floating phase, and the BEMF with the S pole changing from the N pole is generated, the BEMF Emf_C is thereby changed from a positive value to a negative value. At this time, the hysteresis comparator detects the zero-crossing point zc1 immediately after the motor is started, and the detection result is generated. The control unit 18 further generates the commutation signal S2 at the position P1 to make the commutation sequence enter UW from UV.

After the commutation sequence enters UW, the control unit 18 can set the hysteresis comparator to the second voltage level according to the commutation sequence UW, thereby determining whether the BEMF of the floating phase (in this case, the BEMF Emf_B) is larger than the positive value of the hysteresis voltage. At this time, since the S pole of the rotor approaches the floating phase, the BEMF of the S pole is generated, thereby generating the BEMF Emf_B with a negative value. When the S pole of the rotor is far from the floating phase, the BEMF of the N pole is generated, the BEMF Emf_B is turned into a positive value, and the hysteresis comparator detects the zero-crossing point zc2 to generate the detection result. The control unit 18 further generates the commutation signal S2 at a position P3, thereby making the commutation sequence to enter VW from UW. In the present example, since the hysteresis comparator can completely detect a complete trend of the BEMF from negative to positive, a timing at which the commutation signal S2 is generated is a correct commutation timing, and the detection result corresponds to an ideal commutation point. After the motor 11 is stably started, the motor 11 can enter the operating mode.

Figure 8:
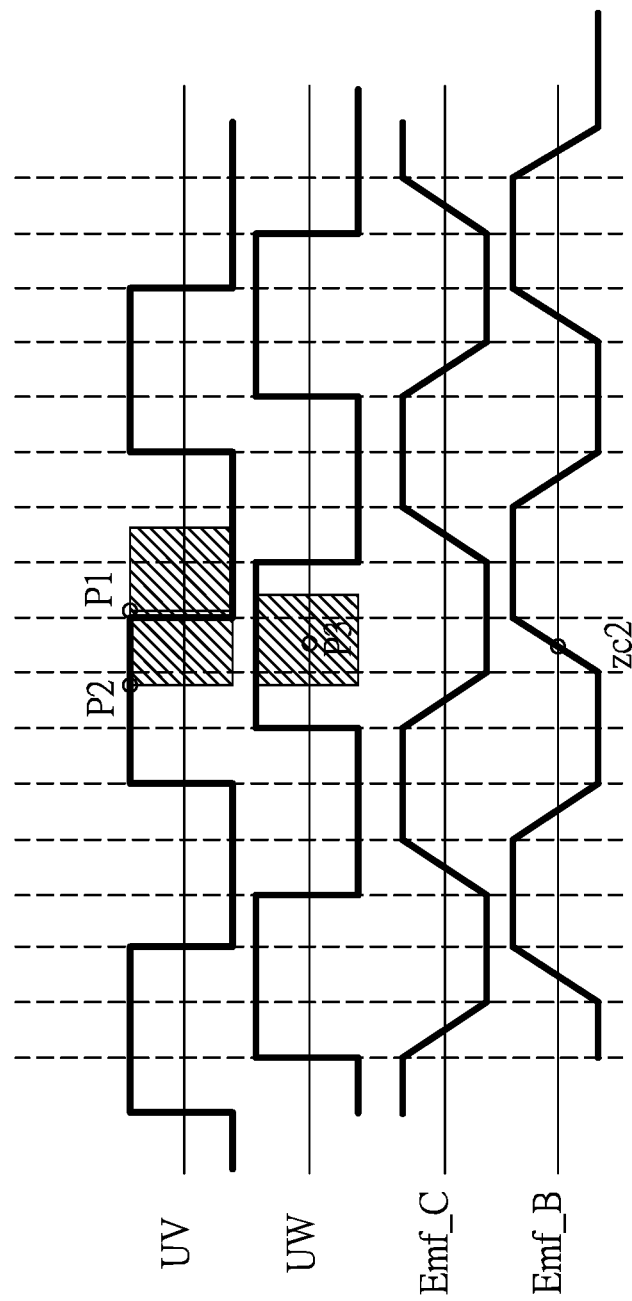
FIG. 8 is a schematic diagram showing a back electromotive force (BEMF) voltage of a floating phase corresponding to a torque generated by a motor in a forward rotation direction according to a third example of motor starting of an embodiment of the present disclosure.
Figure 9A:
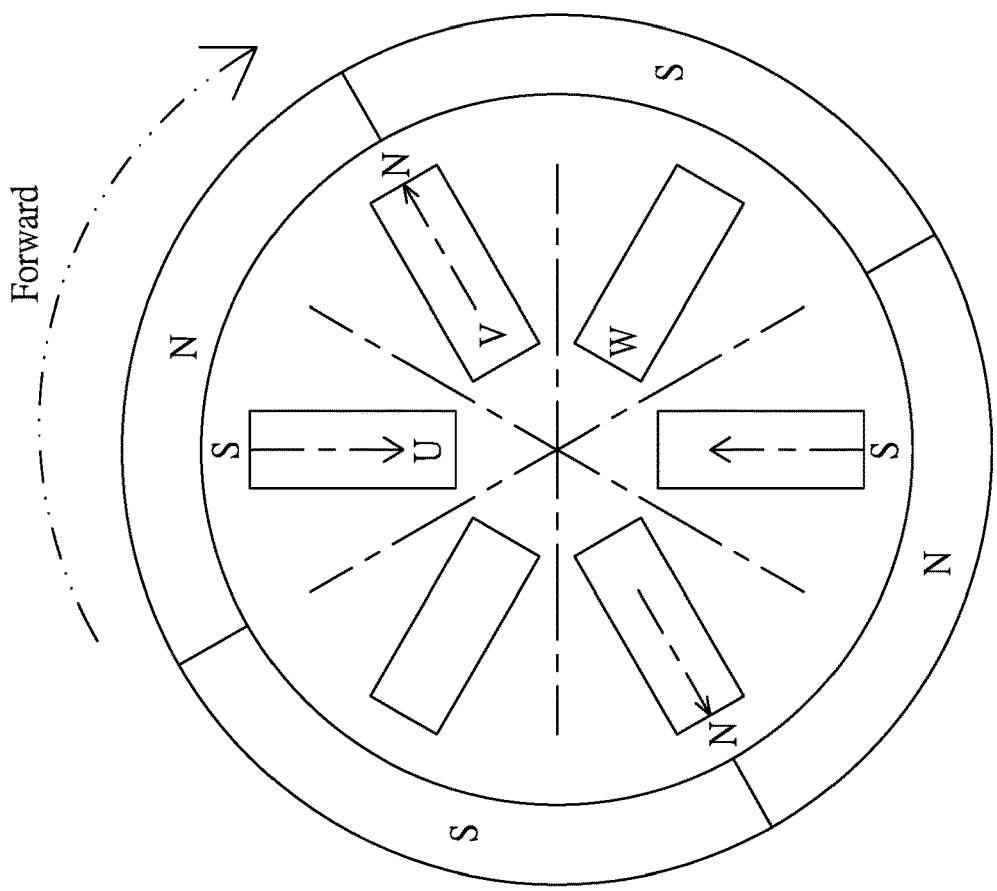
FIGS. 9A and 9B are schematic diagrams showing relative positions of a rotor and a stator of the motor according to the third example of motor starting of an embodiment of the present disclosure.
Figure 9B:
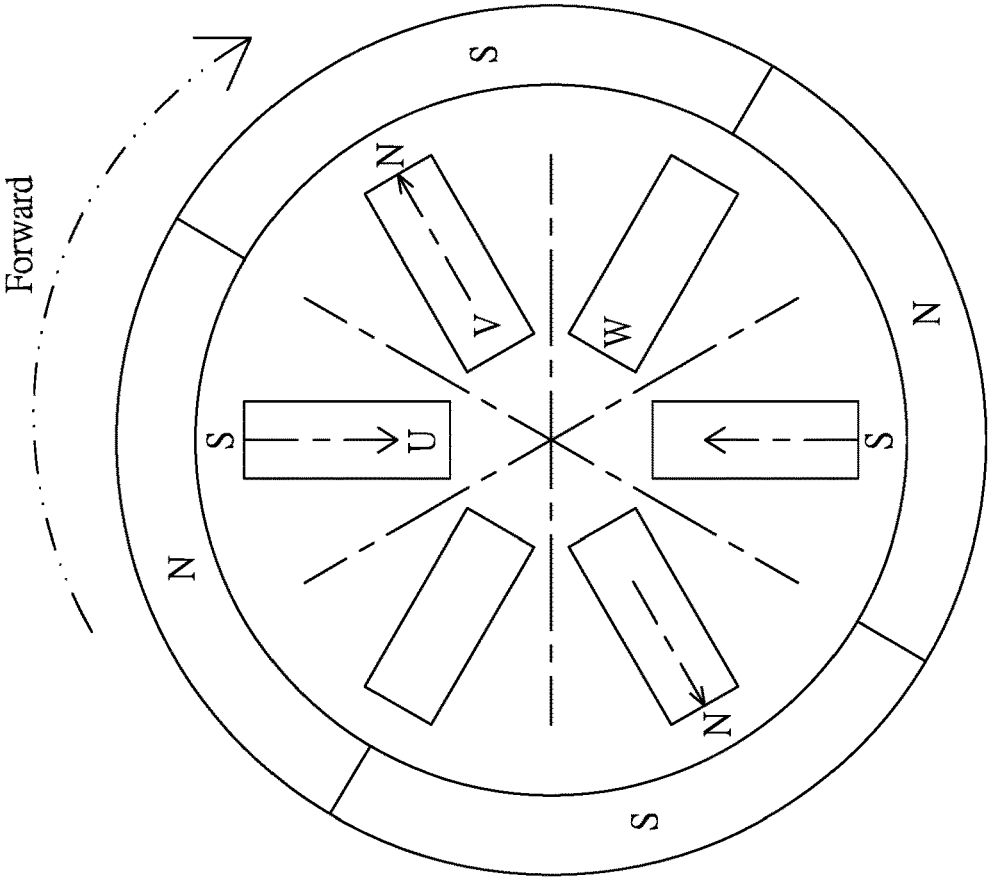

Further, reference is made to FIG. 8, FIG. 9A, and FIG. 9B, FIG. 8 is a schematic diagram showing a back electromotive force (BEMF) voltage of a floating phase corresponding to a torque generated by a motor in a forward rotation direction according to a third example of motor starting of an embodiment of the present disclosure, and FIGS. 9A and 9B are schematic diagrams showing relative positions of a rotor and a stator of the motor according to the third example of motor starting of an embodiment of the present disclosure.

As shown in FIG. 8, FIG. 9A, and FIG. 9B, it is assumed that an initial position of the motor 11 is a position P1, and an initial representation of a rotor and a stator of the motor 11 are schematically shown in FIG. 9B. The control unit 18 can set the hysteresis comparator to the first voltage level according to the commutation sequence UV, and further determine whether the BEMF of the floating phase (in this case, the BEMF Emf_C) is smaller than the negative value of the hysteresis voltage. At this time, since the U phase generates the S pole and the V phase generates the N pole, causing the rotor to be rotated in a reversed rotation direction, an inertia is generated to move the rotor to a position P2, and the rotor and the stator stop rotating as shown in FIG. 9A. In this process, although the BEMF Emf_C seems to induce a negative electromotive force, since the rotor direction is reversed at this time, the induced BEMF Emf_C is substantially a positive value. When the inertia disappears, the rotor starts to rotate forward, and the BEMF Emf_C changes from a positive value to a negative value. At this time, the hysteresis comparator detects that the BEMF Emf_C is smaller than the negative value of the hysteresis voltage immediately after the rotor rotates forward, thereby generating a detection result. The control unit 18 further generates the commutation signal S2 at the position P2, causing the commutation sequence to enter UW from UV.

After the commutation sequence enters UW, the control unit 18 can set the hysteresis comparator to the second voltage level according to the commutation sequence UW, thereby determining whether the BEMF of the floating phase (in this case, the BEMF Emf_B) is larger than the positive value of the hysteresis voltage. At this time, since the S pole of the rotor approaches the floating phase, the BEMF of the S pole is generated, thereby generating the BEMF Emf_B with a negative value. When the S pole of the rotor is far from the floating phase, the BEMF of the N pole is generated, the BEMF Emf_B is turned into a positive value, and the hysteresis comparator detects the zero-crossing point zc2 to generate the detection result. The control unit 18 further generates the commutation signal S2 at a position P3, thereby making the commutation sequence to enter VW from UW. In the present example, since the hysteresis comparator can completely detect a complete trend of the BEMF from negative to positive, a timing at which the commutation signal S2 is generated is a correct commutation timing, and the detection result corresponds to an ideal commutation point. After the motor 11 is stably started, the motor 11 can enter the operating mode.

Figure 10:
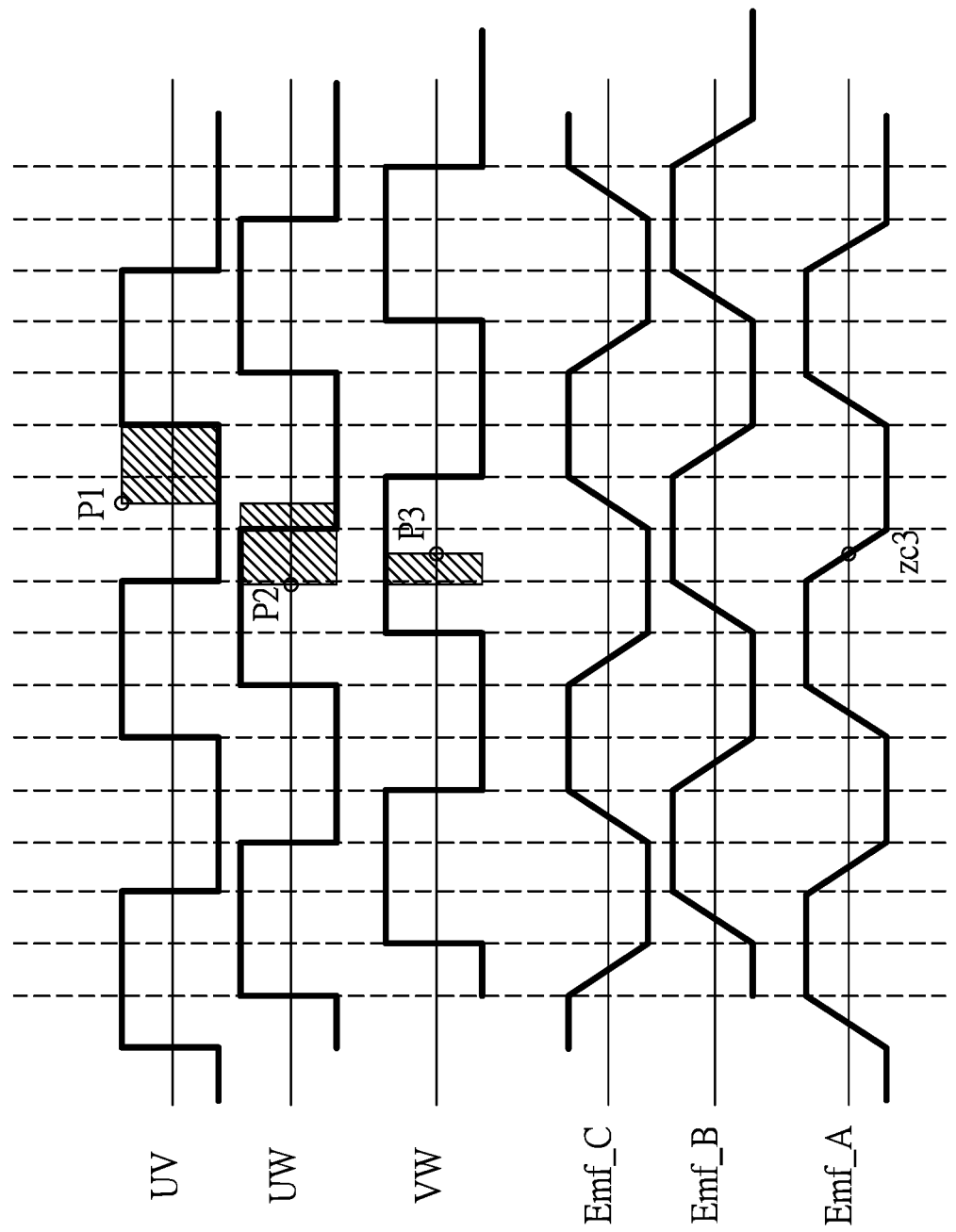
FIG. 10 is a schematic diagram showing a back electromotive force (BEMF) voltage of a floating phase corresponding to a torque generated by a motor in a forward rotation direction according to a fourth example of motor starting of an embodiment of the present disclosure.
Figure 11A:
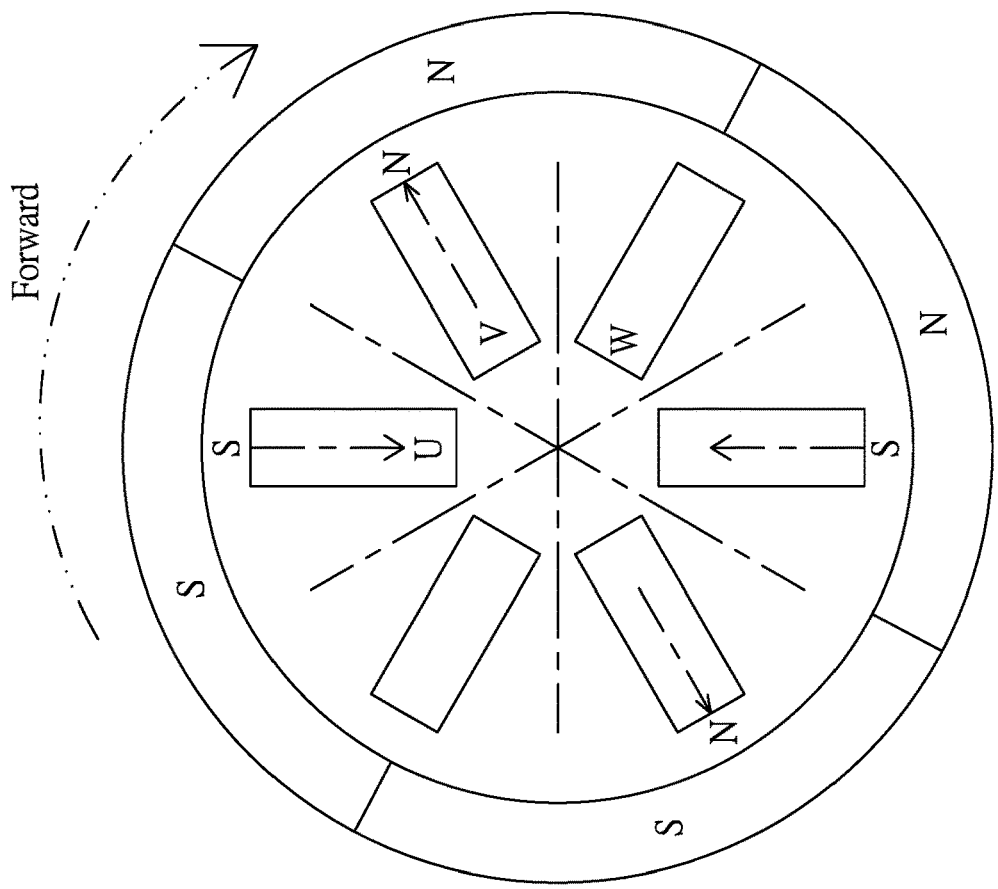
FIGS. 11A and 11B are schematic diagrams showing relative positions of a rotor and a stator of the motor according to the fourth example of motor starting of an embodiment of the present disclosure.
Figure 11B:
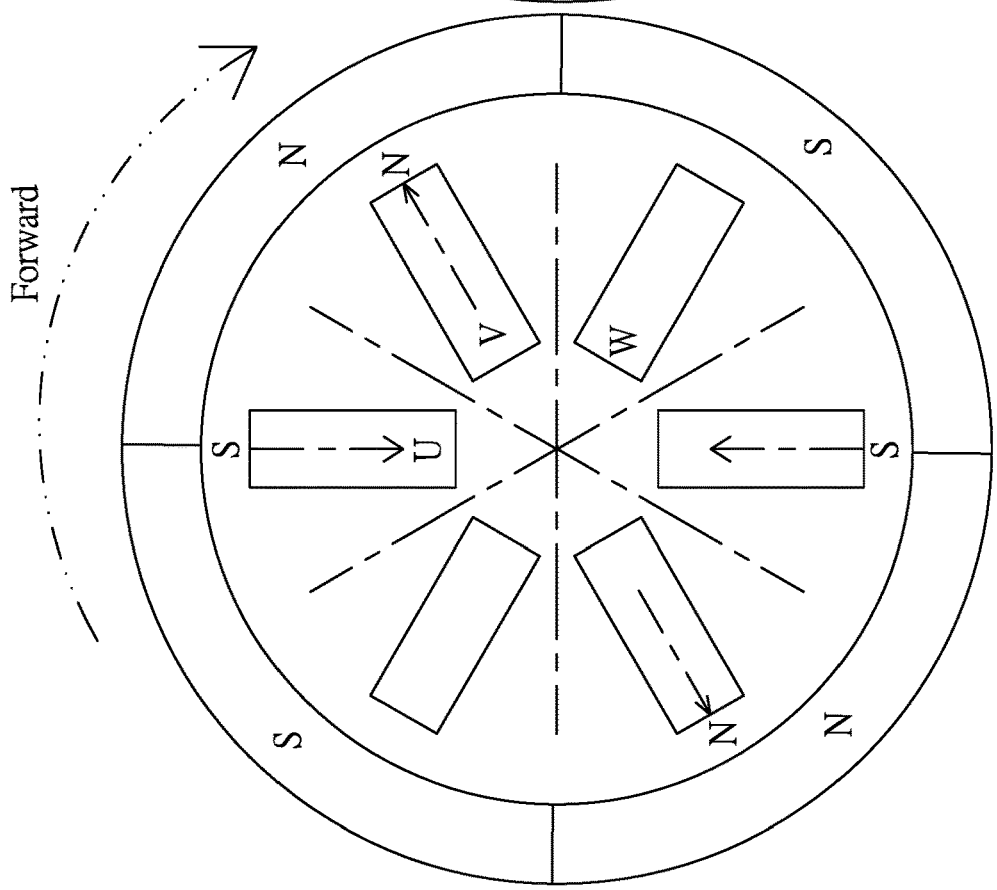

Further, reference is made to FIG. 10, FIG. 11A, and FIG. 11B, which are a schematic diagram showing a back electromotive force (BEMF) voltage of a floating phase corresponding to a torque generated by a motor in a forward rotation direction and schematic diagrams showing relative positions of a rotor and a stator of the motor according to a fourth example of motor starting of an embodiment of the present disclosure.

As shown in FIG. 10, FIG. 11A, and FIG. 11B, it is assumed that an initial position of the motor 11 is a position P1, and an initial representation of a rotor and a stator of the motor 11 are schematically shown in FIG. 11A. The control unit 18 can set the hysteresis comparator to the first voltage level according to the commutation sequence UV, and further determine whether the BEMF of the floating phase (in this case, the BEMF Emf_C) is smaller than the negative value of the hysteresis voltage. At this time, since the U phase generates the S pole and the V phase generates the N pole, causing the rotor to rotate reversely, an inertia is generated to rotate the rotor reversely, and in this process, since a rotor direction is reversed, the induction BEMF Emf_C is substantially a negative value, the hysteresis comparator detects that the back electromotive force Emf_C is smaller than the negative value of the hysteresis voltage, thereby generating the detection result, and the control unit 18 further generates the commutation signal S2 at a position P2, thereby making the commutation sequence to enter UW from UV.

After entering the UW, the control unit 18 can set the hysteresis comparator to the second voltage level according to the commutation sequence UW, thereby determining whether the BEMF of the floating phase (in this case, the BEMF Emf_B) is larger than the positive value of the hysteresis voltage. At this point, the rotor is still rotated in the reversed rotation direction. When the inertia disappears, the rotor starts to rotate forward, and the BEMF Emf_B changes from the negative value to a positive value. At this time, the hysteresis comparator detects that the BEMF Emf_B is larger than the positive value of the hysteresis voltage immediately after the rotor rotates forward, thereby generating a detection result. The control unit 18 further generates the commutation signal S2 at the position P2, causing the commutation sequence to enter VW from UW.

After the commutation sequence enters VW, the control unit 18 can set the hysteresis comparator to the first voltage level according to the commutation sequence VW, thereby determining whether the BEMF of the floating phase (in this case, a BEMF Emf_A) is smaller than the negative value of the hysteresis voltage. At this time, since the S pole of the rotor approaches the floating phase, the BEMF of the S pole is generated, thereby generating the BEMF Emf_A with a negative value. When the S pole of the rotor is far from the floating phase, the BEMF of the N pole is generated, the BEMF Emf_A is turned into a positive value, and the hysteresis comparator detects a zero-crossing point zc3 to generate the detection result. The control unit 18 further generates the commutation signal S2 at a position P3, thereby making the commutation sequence to enter VW from UW. In the present example, since the hysteresis comparator can completely detect a complete trend of the BEMF from negative to positive after the commutation sequence enters UW, a timing at which the commutation signal S2 is generated is a correct commutation timing, and the detection result corresponds to an ideal commutation point. After the motor 11 is stably started, the motor 11 can enter the operating mode.

In other words, according to the first to fourth examples described above, it can be seen that regardless of the relative positions of the rotor and the stator in the motor 11, the BEMF voltage level of the floating phase can be detected, thereby making the commutation point approach the BEMF zero-crossing point, and the ideal commutation point can be finally obtained. Furthermore, the motor starting device provided by the present disclosure does not need to adjust the inertia parameters, and dead points of zero torque can be avoided by adding forced commutation parameters, thereby saving motor design time and other programming costs while providing high applicability and advantages for fan products that are diverse and produced in small quantities.

Figure 12:
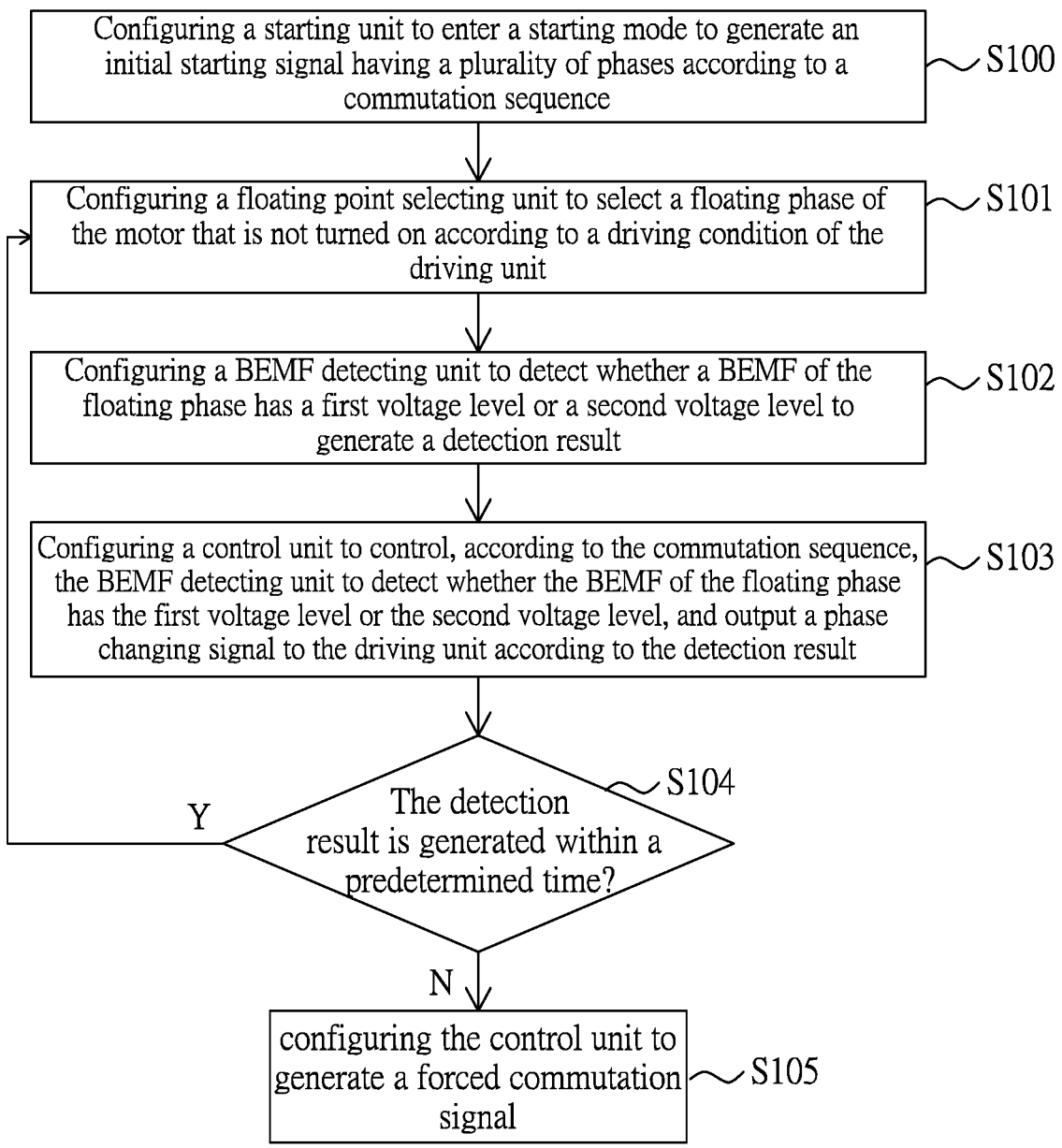
FIGS. 12 and 13 are flowcharts of a motor starting method according to an embodiment of the present disclosure.
Figure 13:
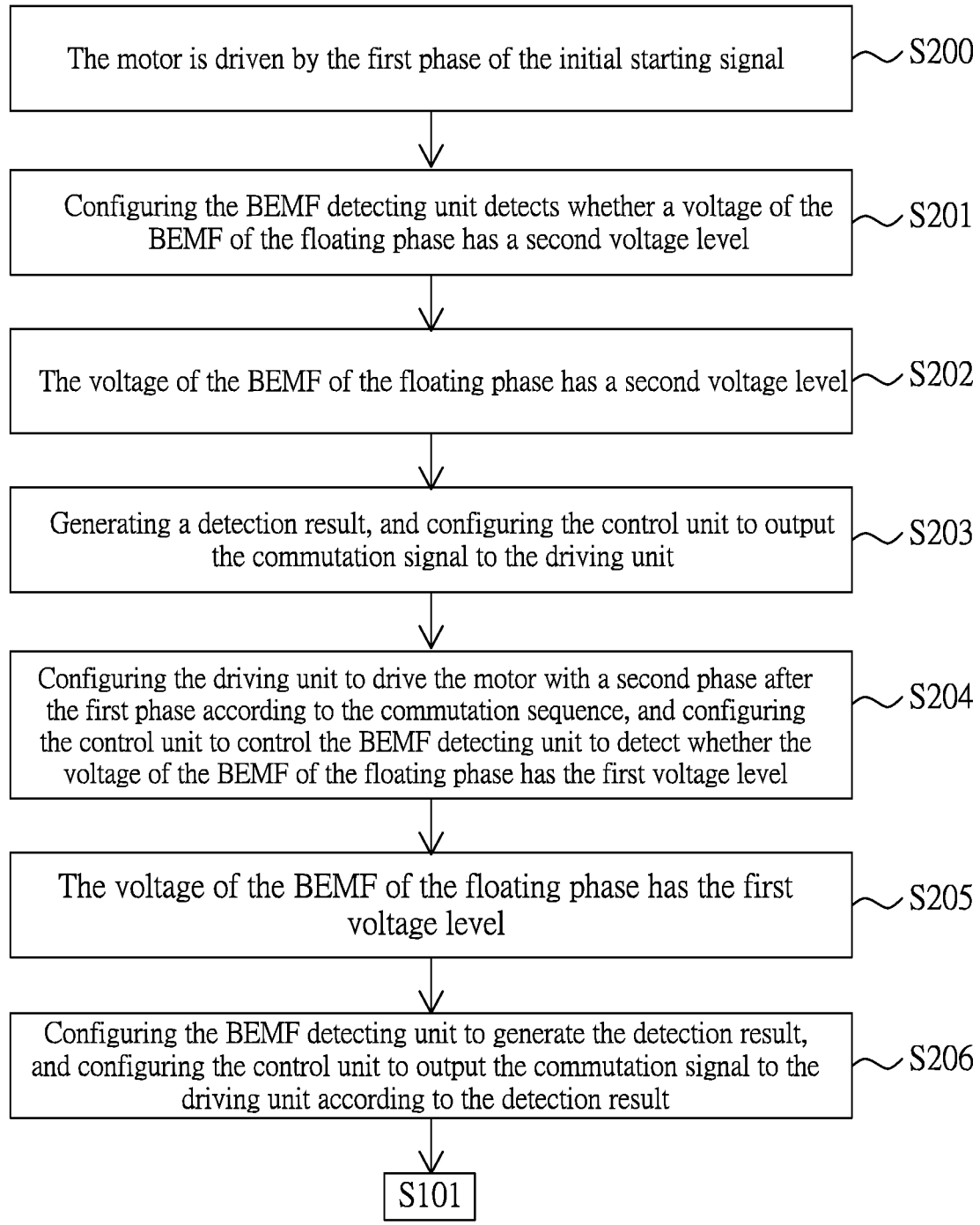

Reference is made to FIGS. 12 and 13, which are flowcharts of a motor starting method according to an embodiment of the present disclosure. The method described in this embodiment can be performed on the motor starting device 1 shown in FIG. 1, and reference is made to FIGS. 1 to 11B together for a better understanding, and the motor starting method includes the following steps:

Step S100: Configuring a starting unit to enter a starting mode to generate an initial starting signal having a plurality of phases according to a commutation sequence, and the commutation sequence is set according to a predetermined rotation direction of the motor.

Step S101: Configuring a floating point selecting unit to select a floating phase of the motor that is not turned on according to a driving condition of the driving unit.

Step S102: Configuring a BEMF detecting unit to detect whether a BEMF of the floating phase has a first voltage level or a second voltage level to generate a detection result.

S103: Configuring a control unit to control, according to the commutation sequence, the BEMF detecting unit to detect whether the BEMF of the floating phase has the first voltage level or the second voltage level, and output a phase changing signal to the driving unit according to the detection result.

Step S104: Configuring the control unit to determine whether the detection result is generated within a predetermined time, if yes, the method returns to step S101, and if the detection result is not generated within the predetermined time, the method proceeds to step S105: configuring the control unit to generate a forced commutation signal to control the driving unit to drive the motor with a phase next to a current phase of the used initial starting signal according to the commutation sequence.

In step S101, after the motor is driven by the first phase of the initial starting signal (step S200), the method proceeds to step S201: configuring the BEMF detecting unit to detect whether a voltage of the BEMF of the floating phase has a second voltage level.

If the voltage of the BEMF of the floating phase has a second voltage level (step S202), the method proceeds to step S203: generating a detection result, and configuring the control unit to output the commutation signal to the driving unit. When the driving unit receives the commutation signal, the method proceeds to step S204: configuring the driving unit to drive the motor with a second phase after the first phase according to the commutation sequence, and configuring the control unit to control the BEMF detecting unit to detect whether the voltage of the BEMF of the floating phase has the first voltage level.

If the voltage of the BEMF of the floating phase has the first voltage level (step S205), the method proceeds to step S206: configuring the BEMF detecting unit to generate the detection result, and configuring the control unit to output the commutation signal to the driving unit according to the detection result, and the method returns to step S101.

In conclusion, the motor starting device and method provided by the present disclosure do not need to adjust the inertia parameters, and dead points of zero torque can be avoided by adding forced commutation parameters, thereby saving motor design time and other programming costs while providing high applicability and advantages for fan products that are diverse and produced in small quantities.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor starting device for starting a motor, comprising:
   a starting unit configured to switch between a starting mode and an operating mode, wherein in the starting mode, the starting unit generates an initial starting signal having a plurality of phases according to a commutation sequence, and the commutation sequence is set according to a predetermined rotation direction of the motor;
   a driving unit coupled to the starting unit and the motor, and configured to drive the motor with a first phase of the initial starting signal;
   a floating point selecting unit coupled to the driving unit and the motor, and configured to select a floating phase of the motor that is not turned on according to a driving condition of the driving unit;
   a back electromotive force (BEMF) detecting unit coupled to the floating point selecting unit and configured to detect whether a back electromotive force (BEMF) of the floating phase has a first voltage level or a second voltage level to generate a detection result; and
   a control unit coupled to the BEMF detecting unit and the driving unit and configured to control, according to the commutation sequence, the BEMF detecting unit to detect whether the BEMF of the floating phase has the first voltage level or the second voltage level, and output a phase changing signal to the driving unit according to the detection result;
   wherein the BEMF detecting unit is configured to, after the motor is driven by the first phase of the initial starting signal, detect whether a voltage of the BEMF of the floating phase has the second voltage level, and if the voltage of the BEMF of the floating phase has the second voltage level, the BEMF detecting unit is configured to generate the detection result, and the control unit is configured to output the commutation signal to the driving unit;
   wherein the driving unit is configured to, in response to receiving the commutation signal, drive the motor with a second phase after the first phase according to the commutation sequence; the control unit controls the BEMF detecting unit to detect whether the voltage of the BEMF of the floating phase has the first voltage level, and if the voltage of the BEMF of the floating phase has the first voltage level, the BEMF detecting unit generates the detection result, and the control unit is configured to output the commutation signal to the driving unit according to the detection result;
   wherein the control unit is configured to determine whether the detection result is generated within a predetermined time, and if the detection result is not generated within the predetermined time, the control unit generates a forced commutation signal to control the driving unit to drive the motor with a phase next to a current phase of the used initial starting signal according to the commutation sequence.

2. The motor starting device according to claim 1, wherein the control unit is configured to calculate a number of the detection results, and determine whether the number of the detection results exceeds a predetermined number, and if the number of the detection results exceeds the predetermined number, the control unit is configured to control the starting unit to enter the operating mode to generate an operating signal, and the driving unit drives the motor according to the operating signal.

3. The motor starting device according to claim 1, wherein the BEMF detecting unit includes a hysteresis comparator configured to detect whether the BEMF of the floating phase is larger than a positive value of a hysteresis voltage or smaller than a negative value of the hysteresis voltage, the hysteresis comparator generates a high voltage level or a low voltage level as the detection result.

4. The motor starting device according to claim 3, wherein the control unit is configured to set the hysteresis comparator to the first voltage level according to the commutation sequence of the plurality of phases to determine whether the BEMF of the floating phase is smaller than the negative value of the hysteresis voltage, or the control unit is configured to set the hysteresis comparator to the second voltage level to determine whether the BEMF of the floating phase is larger than the positive value of the hysteresis voltage.

5. The motor starting device according to claim 4, wherein when the control unit is configured to set the hysteresis comparator to the first voltage level to determine whether the BEMF of the floating phase is smaller than the negative value of the hysteresis voltage, and if the BEMF of the floating phase is determined to be smaller than the negative value of the hysteresis voltage, the hysteresis comparator generates the low voltage level as the detection result.

6. The motor starting device according to claim 5, wherein when the control unit is configured to set the hysteresis comparator to the second voltage level to determine whether the BEMF of the floating phase is larger than the positive value of the hysteresis voltage, and if the BEMF of the floating phase is determined to be larger than the positive value of the hysteresis voltage, the hysteresis comparator generates the high voltage level as the detection result.

7. The motor starting device according claim 1, wherein the control unit is further configured to, after the commutation signal or the forced commutation signal is generated, control the BEMF detecting unit to detect the BEMF of the floating phase after a masking duration.

8. The motor starting device according to claim 1, wherein after the driving unit receives the commutation signal or the forced commutation signal, the driving unit converts the phase next to the current phase of the initial switching signal used to drive the motor to a soft switching signal to drive the motor.

9. A motor starting method for starting a motor, comprising the following steps:
   configuring a starting unit to enter a starting mode to generate an initial starting signal having a plurality of phases according to a commutation sequence, and the commutation sequence is set according to a predetermined rotation direction of the motor;
   configuring a driving unit to drive the motor with a first phase of the initial starting signal;

configuring a floating point selecting unit to select a floating phase of the motor that is not turned on according to a driving condition of the driving unit;

configuring a back electromotive force (BEMF) detecting unit to detect whether a back electromotive force (BEMF) of the floating phase has a first voltage level or a second voltage level to generate a detection result;

configuring a control unit to control, according to the commutation sequence, the BEMF detecting unit to detect whether the BEMF of the floating phase has the first voltage level or the second voltage level, and output a phase changing signal to the driving unit according to the detection result;

configuring the control unit to determine whether the detection result is generated within a predetermined time, and if the detection result is not generated within the predetermined time, configuring the control unit to generate a forced commutation signal to control the driving unit to drive the motor with a phase next to a current phase of the used initial starting signal according to the commutation sequence;

configuring the BEMF detecting unit to, after the motor is driven by the first phase of the initial starting signal, detect whether a voltage of the BEMF of the floating phase has the second voltage level, and if the voltage of the BEMF of the floating phase has the second voltage level, configuring the BEMF detecting unit to generate the detection result, and configuring the control unit to output the commutation signal to the driving unit; and configuring the driving unit to, in response to receiving the commutation signal, drive the motor with a second phase after the first phase according to the commutation sequence, and configuring the control unit to control the BEMF detecting unit to detect whether the voltage of the BEMF of the floating phase has the first voltage level, and if the voltage of the BEMF of the floating phase has the first voltage level, configuring the BEMF detecting unit to generate the detection result, and configuring the control unit to output the commutation signal to the driving unit according to the detection result.

10. The motor starting method according to claim 9, further comprising:
configuring the control unit to calculate a number of the detection results, and determine whether the number of the detection results exceeds a predetermined number, and if the number of the detection results exceeds a predetermined number, configuring the control unit to control the starting unit to enter an operating mode to generate an operating signal, and the driving unit to drive the motor according to the operating signal.

11. The motor starting method according to claim 9, wherein the BEMF detecting unit includes a hysteresis comparator, and the motor starting method further comprising: configuring the hysteresis comparator to detect whether the BEMF of the floating phase is larger than a positive value of a hysteresis voltage or smaller than a negative value of the hysteresis voltage, and generate a high voltage level or a low voltage level as the detection result.

12. The motor starting method according to claim 11, further comprising:
configuring the control unit to set the hysteresis comparator to the first voltage level according to the commutation sequence of the plurality of phases to determine whether the BEMF of the floating phase is smaller than the negative value of the hysteresis voltage, or configuring the control unit to set the hysteresis comparator to the second voltage level to determine whether the BEMF of the floating phase is larger than the positive value of the hysteresis voltage.

13. The motor starting method according to claim 12, wherein when the hysteresis comparator is set to the first voltage level to determine whether the BEMF of the floating phase is smaller than the negative value of the hysteresis voltage, and if the BEMF of the floating phase is determined to be smaller than the negative value of the hysteresis voltage, the hysteresis comparator generates the low voltage level as the detection result.

14. The motor starting method according to claim 13, wherein when the hysteresis comparator is set to the second voltage level to determine whether the BEMF of the floating phase is larger than the positive value of the hysteresis voltage, and if the BEMF of the floating phase is determined to be larger than the positive value of the hysteresis voltage, the hysteresis comparator generates the high voltage level as the detection result.

15. The motor starting method according claim 9, further comprising:
configuring the control unit to, after the commutation signal or the forced commutation signal is generated, control the BEMF detecting unit to detect the BEMF of the floating phase after a masking duration.

16. The motor starting method according to claim 9, further comprising:
configuring the driving unit to, after the driving unit receives the commutation signal or the forced commutation signal, convert the phase next to the current phase of the initial switching signal used to drive the motor to a soft switching signal to drive the motor.

* * * * *